US012791916B2

(12) United States Patent
Gong et al.

(10) Patent No.: US 12,791,916 B2
(45) Date of Patent: Nov. 10, 2026

(54) VOICE COIL MOTOR AND ZOOM LENS

(71) Applicant: ZHONGSHAN UNION OPTECH RESEARCH INSTITUTE CO., LTD., Zhongshan (CN)

(72) Inventors: Junqiang Gong, Zhongshan (CN); Meijiao Zhao, Zhongshan (CN); Kun Li, Zhongshan (CN); Shengping Qiu, Zhongshan (CN)

(73) Assignee: ZHONGSHAN UNION OPTECH RESEARCH INSTITUTE CO., LTD., Zhongshan (CN)

( * ) Notice: Subject to any disclaimer, the term of this patent is extended or adjusted under 35 U.S.C. 154(b) by 296 days.

(21) Appl. No.: 18/604,237

(22) Filed: Mar. 13, 2024

(65) Prior Publication Data

US 2025/0251645 A1 Aug. 7, 2025

(30) Foreign Application Priority Data

Feb. 6, 2024 (CN) ........................ 202410173394.4

(51) Int. Cl.

| | |
|---|---|
| ***G03B 13/34*** | (2021.01) |
| ***G02B 7/08*** | (2021.01) |
| ***G03B 3/10*** | (2021.01) |
| ***H02K 33/18*** | (2006.01) |

(52) U.S. Cl.

CPC ............... *G03B 13/34* (2013.01); *G02B 7/08* (2013.01); *G03B 3/10* (2013.01); *H02K 33/18* (2013.01); *G03B 2205/0069* (2013.01)

(58) Field of Classification Search

None

See application file for complete search history.

(56) References Cited

U.S. PATENT DOCUMENTS

| | | | | |
|---|---|---|---|---|
| 2013/0120860 A1* | 5/2013 | Sato | G02B 7/102 359/824 |
| 2023/0388634 A1* | 11/2023 | Song | H04N 23/69 |
| 2025/0138389 A1* | 5/2025 | Fujinaka | G02B 7/102 |

FOREIGN PATENT DOCUMENTS

| | | | | |
|---|---|---|---|---|
| CN | 101527494 A | * | 9/2009 | |
| JP | 2022161138 A | * | 10/2022 | |
| WO | WO-2023171049 A1 | * | 9/2023 | G02B 7/08 |

* cited by examiner

*Primary Examiner* — Robert E. Tallman

(74) *Attorney, Agent, or Firm* — Westbridge IP LLC

(57) ABSTRACT

Disclosed are a voice coil motor and a zoom lens. The voice coil motor includes a magnetic yoke, a magnet structure and a drive coil. The magnet structure is provided on the magnetic yoke and includes two magnetic circuit components spaced in an up-down direction. Each magnetic circuit component includes two magnets spaced in the up-down direction. The magnetic poles on the sides of the two magnets that are close to each other are provided in a different manner. The two magnets form a magnetic gap. The driving coil includes two wire groups that are oppositely provided in the up-down direction. One of the wire groups is located in the magnetic gap formed by the two magnets of one magnetic circuit component, and the other wire group is located in the magnetic gap formed by the two magnets of another magnetic circuit component.

10 Claims, 2 Drawing Sheets

VOICE COIL MOTOR AND ZOOM LENS

CROSS-REFERENCE TO RELATED APPLICATIONS

The present application claims priority to Chinese Patent Application No. 202410173394.4, filed on Feb. 6, 2024, the entire contents of which are incorporated herein by reference.

TECHNICAL FIELD

The present application relates to the technical field of a zoom lens, and in particular to a voice coil motor and a zoom lens.

BACKGROUND

A voice coil motor (VCM) is a new linear motor designed based on the Ampere force principle, named because its principle is similar to that of a speaker. It mainly consists of three parts: permanent magnet, coil and yoke. The principle is that when the coil is energized, a force will be generated in the magnetic field. The magnitude of the force is proportional to the current applied to the coil. According to the Lorentz force principle, a thrust will be generated to drive the coil to move axially in the air gap. As the direction and value of the current in the coil change, the coil moves back and forth in a straight line. In theory, voice coil motors have the advantages of high response, high acceleration, simple structure and good force characteristics. They have simple structure, small size, low noise, high specific thrust, large acceleration (more than 20 times the acceleration of gravity), and fast response speed (millisecond level), high precision (up to 1-5 μm), easy maintenance and high reliability.

In the new long-stroke VCM motor structure in the related art, the moving stroke of the mover is relatively long and the motor power is relatively large; but when the stroke is too long, the magnetic force will be small in the middle of the magnet, and the motor power will be greatly affected. The longer the structure length, the smaller the magnetic field, and the smaller the driving force. To increase the driving force, the volume needs to be continuously increased; that is, the stroke on the structure has a certain limit, and the driving force and volume are also limited.

SUMMARY

The main purpose of the present application is to provide a voice coil motor and a zoom lens, aiming to solve the problem that the existing VCM motor is limited by its volume and the design stroke of the VCM motor is relatively small.

In order to achieve the above objective, the present application provides a voice coil motor, which includes:

- a mounting base;
- a magnet structure provided on the mounting base, the magnet structure includes two magnetic circuit components provided at intervals in an up-down direction, and each of the magnetic circuit components includes two magnets provided at intervals in the up-down direction; magnetic poles are provided in a different manner on a side of the two magnets that are close to each other, and the two magnets form a magnetic gap extending in a front-back direction; and
- a driving coil including two wire groups provided opposite to each other in the up-down direction, one of the wire groups is located in the magnetic gap formed by the two magnets of the magnetic circuit component, and the other wire group is located in the magnetic gap formed by the two magnets of the other magnetic circuit component; in response to that the driving coil is energized, the two magnetic circuit components are configured to generate an electromagnetic force with the driving coil to drive the driving coil to move in the front-back direction.

In an embodiment, each of the magnets includes a plurality of loadstones provided at intervals in the front-back direction.

In an embodiment, the mounting base is configured as a magnetic yoke, and the magnetic yoke is configured to form a mounting groove with an opening; the opening is provided on a side of the magnetic yoke in a left-right direction and extends in the front-back direction, and the magnet structure and the driving coil are both installed in an installation cavity.

In an embodiment, the magnetic yoke includes two first magnetic yokes extending in the front-back direction and provided at intervals in the up-down direction; and a side of one first magnetic yoke facing the other first magnetic yoke is fixed to the magnet.

In an embodiment, the two first magnetic yokes are recessed on the side surfaces close to each other to form limit grooves, and the magnet is installed in a corresponding limit groove.

In an embodiment, the magnetic yoke further includes two second magnetic yokes provided at intervals in the front-back direction, and the two second magnetic yokes are respectively provided at two ends of the two first magnetic yokes in the front-back direction.

In an embodiment, the magnetic yoke further includes a third magnetic yoke provided at side ends of the two first magnetic yokes in the left-right direction, and the two first magnetic yokes, the two second magnetic yokes and the third magnetic yoke are enclosed to form the installation cavity.

In an embodiment, the magnetic yoke is further provided with a fourth magnetic yoke extending in the front-back direction, and the fourth magnetic yoke is provided in the mounting groove and located between the two magnetic circuit components; and the magnet is respectively installed on two sides of the fourth magnetic yoke in the up-down direction.

A zoom lens includes: a lens assembly, including an adjustable lens group movable in a front-back direction; and the voice coil motor as described above, the voice coil motor is provided with a driving coil fixedly connected to the adjustable lens group.

In an embodiment, multiple driving coils and multiple adjustable lens groups are provided, and each of the adjustable lens groups is fixedly connected to a corresponding driving coil. In the technical solution provided by the present application, the driving coil is arranged in an annular shape and has two wire groups provided opposite to each other in the up-down direction, the magnet structure includes two magnetic circuit components, each of the magnetic circuit components includes two magnets with magnetic poles provided in a different manner, and a magnetic gap is formed between the two magnets. One wire group is located in the magnetic gap formed by the two magnets of one magnetic circuit component, and the other wire group is located in the magnetic gap formed by the two magnets of the other magnetic circuit component. When the driving coil is energized, the two wire groups are respectively in the magnetic field generated by the two magnets. According to Ampere's rule, the two wire groups are subjected to the action of Ampere force, so that both the upper and lower sides of the driving coil can move under the action of ampere force. Compared with the situation in the related art where one side of the coil is in the magnetic field or loadstones are provided on both sides of the coil, the present application adopts a method where both sides of the driving coil are in the magnetic gap formed by two magnets, the two magnets can generate a sufficiently strong magnetic field. When the driving coil has a long travel, it can also be in a strong magnetic field, and both sides of the driving coil are driven synchronously, with strong driving force, to solve the problem that the existing VCM motor is limited by its volume and the design stroke of the VCM motor is relatively small.

BRIEF DESCRIPTION OF THE DRAWINGS

In order to describe the technical solutions in the embodiments of the present application or in the related art more clearly, the accompanying drawings used in the description of the embodiments or the related art will be briefly introduced below. Obviously, the drawings in the following description are only some embodiments of the present application. For those skilled in the art, other drawings can be obtained based on the structures shown in these drawings without creative efforts.

Figure 1:
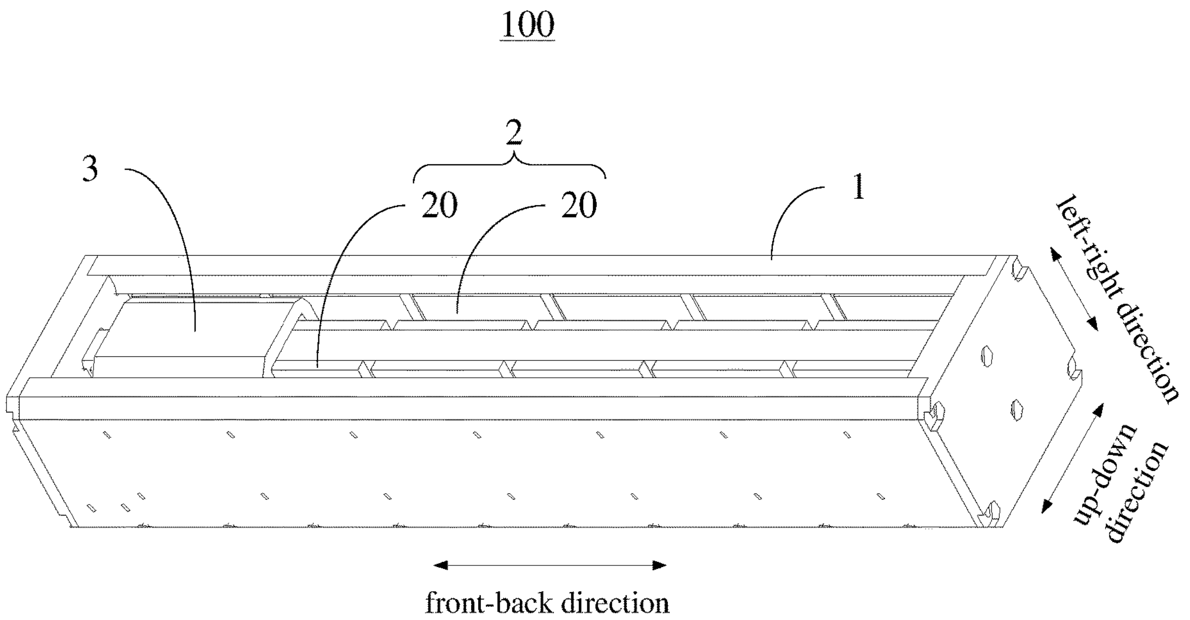
FIG. 1 is a three-dimensional schematic diagram of a voice coil motor according to an embodiment of the present application.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments of the present application will be clearly and completely described below with reference to the accompanying drawings in the embodiments of the present application. Obviously, the described embodiments are only some rather than all of the embodiments of the present application. Based on the embodiments of the present application, all other embodiments obtained by those skilled in the art without creative efforts fall within the scope of the present application.

It should be noted that if there are directional indications (such as up, down, left, right, front, back . . . ) in the embodiments of the present application, the directional indications are only used to explain the relative positional relationship, movement situation, etc. between the components in a specific posture (as shown in the drawings). If the specific posture changes, the directional indication will also change accordingly.

In addition, if there are descriptions related to "first", "second", etc. in the embodiments of the present application, the descriptions of "first", "second", etc. are only for descriptive purposes and cannot be understood as indicating or implying their relative importance or implicitly indicating the number of technical features indicated. Therefore, features defined with "first" and "second" can explicitly or implicitly include at least one of these features. In addition, the meaning of "and/or" appearing in the entire text includes three parallel solutions. Taking "A and/or B" as an example, it includes solution A, or solution B, or a solution that satisfies both A and B. In addition, the technical solutions in various embodiments can be combined with each other, but it must be based on the realization by those skilled in the art. When the combination of technical solutions is contradictory or cannot be realized, it should be considered that such a combination of technical solutions does not exist, nor within the scope of the present application.

In the new long-stroke VCM motor structure in the related art, the moving stroke of the mover is relatively long and the motor power is relatively large. However, when the stroke is too long, the magnetic force will be small in the middle of the magnet, and the motor power will be greatly affected. The longer the length of the structure, the smaller the magnetic field, and the smaller the driving force. If the driving force needs to be increased, the volume needs to be continuously increased; that is, the stroke on the structure has a certain limit, and the driving force and volume are also limited.

Mainly aimed at the VCM motor design with existing structures, single yoke single-sided magnet or double yoke single-sided magnet drive has the following defects.

Firstly, single yoke magnet or double yoke single-sided magnet drive coil VCM motor has low magnetic field strength and relatively low driving force.

Secondly, single yoke magnet or double yoke single-sided magnet drive coil VCM motor. Due to the influence of driving force, volume and other factors, the design stroke of VCM motor is relatively small.

Lastly, single yoke magnet or double yoke single-sided magnet drive coil VCM motor, in order to achieve greater driving force, thicker and wider large magnets and large yokes are required, resulting in relatively high costs.

Figure 2:
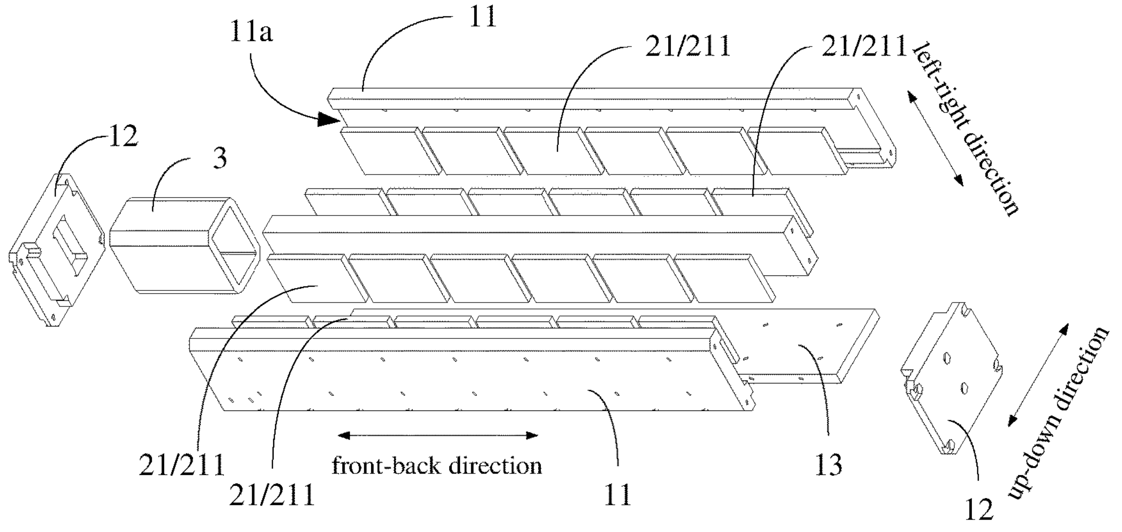
FIG. 2 is an exploded schematic diagram of the voice coil motor in FIG. 1.
Figure 3:
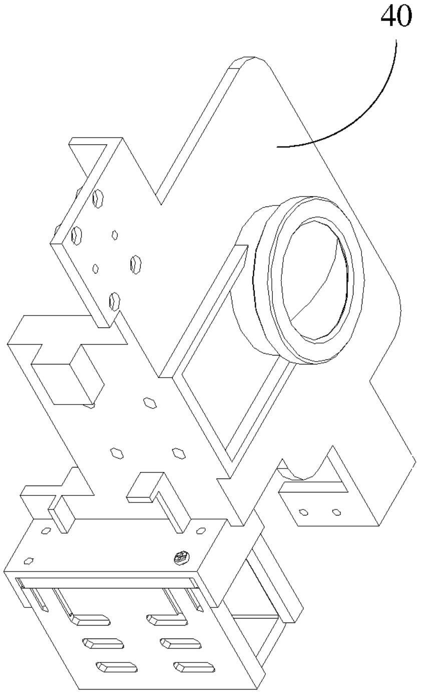
FIG. 3 is a three-dimensional schematic diagram of an adjustable lens group of a zoom lens according to the present application.
Figure 4:
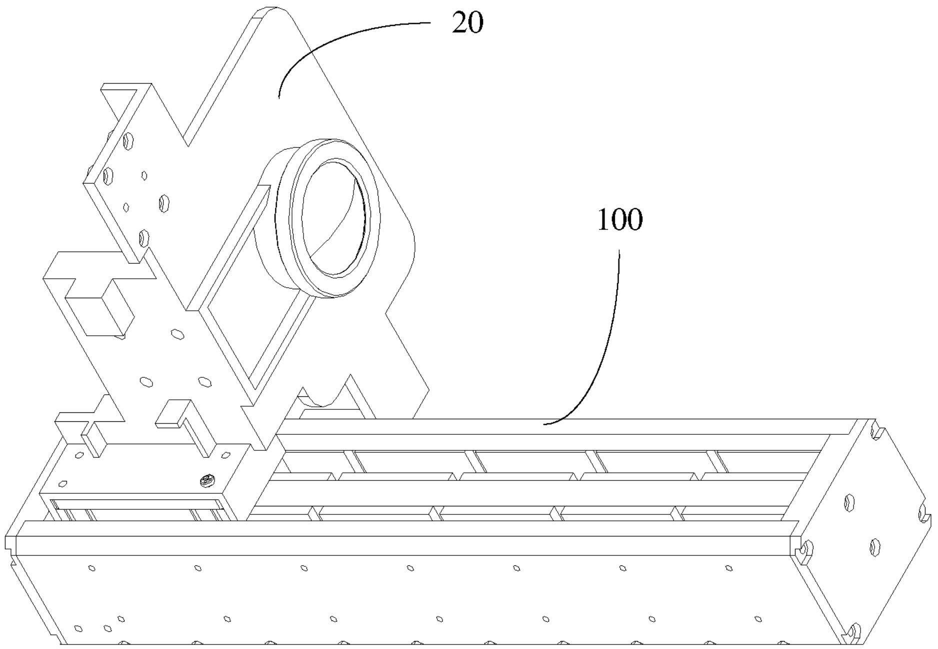
FIG. 4 is a three-dimensional schematic diagram of the adjustable lens group and the voice coil motor in the zoom lens according to the present application.

In order to solve the above problems, the present application provides a voice coil motor. FIG. 1 is a three-dimensional schematic diagram of the voice coil motor according to an embodiment of the present application; FIG. 2 is an exploded schematic diagram of the voice coil motor in FIG. 1; FIG. 3 is a three-dimensional schematic diagram of the adjustable lens group of the zoom lens provided by the present application; and FIG. 4 is a three-dimensional schematic diagram of the adjustable lens group and the voice coil motor in the zoom lens provided by the present application.

Referring to FIGS. 1 to 2, the voice coil motor 100 includes a mounting base 1, a magnet structure 2 and a driving coil 3. The magnet structure 2 is provided on the mounting base 1. The magnet structure 2 includes two magnetic circuit components 20 provided at intervals in a up-down direction. Each of the magnetic circuit components 20 includes two magnets 21 provided at intervals in the up-down direction. The two magnets 21 have magnetic poles provided in a different manner on the sides close to each other and are formed with a magnetic gap extending in the front-back direction. The driving coil 3 includes two wire groups 31 that are provided opposite to each other in the up-down direction, one of the wire groups 31 is located in the magnetic gap formed by the two magnets 21 of one magnetic circuit component 20, and the other wire group 31 is located in the magnetic gap formed by the two magnets 21 of the other magnetic circuit component 20. When the driving coil 3 is energized, the two magnetic circuit components 20 is configured to generate an electromagnetic force with the driving coil 3 to drive the driving coil 3 to move in the front-back direction.

It should be noted that the two wire groups 31 of the driving coil 3 are provided opposite to each other. When energized, the two wire groups 31 have current with opposite directions. In order to make ampere force generated by the two wire groups 31 have the same direction, the direction of the magnetic poles of the two magnets 21 of each magnetic circuit component 20 can be adjusted. For example, a magnetic field that passes downwards through the palm is formed between the two magnets 21 of one magnetic circuit component 20, and a magnetic field that passes upwards through the palm is formed between the two magnets 21 of the other magnetic circuit component 20. In this way, when the currents of the two wire groups 31 have different directions, the resulting ampere force can eventually be directed forward or backward at the same time, thereby generating double the driving force.

It should also be noted that the two wire groups 31 of the driving coil 3 can be provided as two side portions of the driving coil 3 in the up-down direction, or can be provided as two side portions in the left-right direction. Correspondingly, the two magnetic circuit components 20 are spaced apart from each other in the left-right direction, and each of the magnetic circuit components 20 includes two magnets 21 provided at intervals in the left-right direction. The specific locations of the two wire groups 31 on the driving coil 3 are not limited to the above examples. Under the inspiration of the technical essence of the embodiments in the description, other changes made by those skilled in the art can be covered within the scope of the embodiments in this specification, as long as their functions and effects are the same or similar to those of the embodiments in the description.

It should also be noted that the mounting base 1 can be made from non-magnetic conduction material or a magnetically conductive yoke, which is not limited in this embodiment.

In the technical solution provided by the present application, the driving coil 3 is arranged in an annular shape and has two wire groups 31 provided opposite to each other in the up-down direction, the magnet structure 2 includes two magnetic circuit components 20, each of the magnetic circuit components 20 includes two magnets 21 with magnetic poles provided in a different manner, and a magnetic gap is formed between the two magnets 21. One wire group 31 is located in the magnetic gap formed by the two magnets 21 of the magnetic circuit component 20, and the other wire group 31 is located in the magnetic gap formed by the two magnets 21 of the other magnetic circuit component 20. When the driving coil 3 is energized, the two wire groups 31 are located respectively in the magnetic field generated by the two magnets 21. According to Ampere's rule, the two wire groups 31 are subjected to the action of Ampere force, so that both the upper and lower sides of the driving coil 3 can move under the action of ampere force. Compared with the situation in the related art where one side of the coil is in a magnetic field or magnets 211 are provided on both sides of the coil, the present application adopts a method where both sides of the driving coil 3 are in the magnetic gap formed by two magnets 21, the two magnets 21 can generate a sufficiently strong magnetic field. When the driving coil 3 has a long travel, it can also be in a strong magnetic field, and both sides of the driving coil 3 are driven synchronously, with a strong driving force. That is, under the condition of a certain volume, the driving force can be extremely large to solve the problem that the existing VCM motor is limited by its volume and the design stroke of the VCM motor is relatively small.

In this embodiment, each of the magnets 21 includes a plurality of magnets 211 provided at intervals in the front-back direction. In this way, the magnet 211 can be used as a minimum unit that provides a magnetic field. The voice coil motor 100 can reasonably set the number of the magnets 211 according to the required length of the driving stroke, and set multiple magnets 211. Each magnet 211 is more stable. In addition, the requirement of the magnet volume is small, so that the mounting base 1 has a small volume requirement and a low cost.

In this embodiment, the mounting base 1 is configured as a magnetic yoke, and the magnetic yoke forms a mounting groove with an opening. The opening is provided on a side of the magnetic yoke in the left-right direction and extends in the front-back direction. The magnet structure 2 and the driving coil 3 are both installed in the installation cavity. It should be noted that the magnetic yoke is made from permeability material. The permeability material refers to a material that can effectively concentrate and guide magnetic lines of force, generally is iron, steel, ferrite, etc. The magnetic yoke surrounds the periphery of a plurality of the magnetic yoke, which can limit the loss of the magnetic field, improve the utilization of the magnetic field, and protect the coil from external interference.

In this embodiment, the magnetic yoke includes two first magnetic yokes 11 that extend in the front-back direction and are provided at intervals in the up-down direction. Each first magnetic yoke 11 faces one side of the other first magnetic yoke and is fixed with the magnet 21. The first magnetic yoke 11 guides the magnetic lines of force from extreme of one magnet 21 to the extreme of the other magnet 21, forming a closed magnetic loop to provide a path with low magnetic resistance, so that the magnetic lines of force can flow more efficiently, thereby increasing the strength and stability of the magnetic field. In this way, each magnet 21 is fixedly attached to one side of the corresponding first yoke 1 to limit the dissipation of the magnetic field in the up-down direction, thereby improving the utilization of the magnetic field in the up-down direction.

In this embodiment, the sides of the two first yokes 1 that are close to each other are recessed to form limit grooves 11*a*, and one magnet 21 is installed in the corresponding limit groove 11*a*. In this way, the magnet 21 is installed by providing the installation groove, so that the magnet 21 is limited in the installation groove, and the structure is more stable.

Furthermore, in this embodiment, the magnetic yoke further includes two second magnetic yokes 12, which are provided at intervals in the front-back direction. The two second magnetic yokes 12 are respectively provided at two ends of the two first magnetic yokes 11 in the front-back direction. In this way, the two second yokes 2 extends to the ends of the voice coil motor 100 to further enhance the focusing effect of the magnetic field and provide additional mechanical protection, and to some extent, limit the driving coil 3.

Further, in this embodiment, the magnetic yoke also includes a third magnetic yoke 3 provided at the side ends of the two first magnetic yokes 11 in the left-right direction. The two first magnetic yokes 11, the two second magnetic yokes 12 and the third magnetic yoke 3 are enclosed to form the installation cavity. By providing the third magnetic yoke 3, the magnetic field generated in the side range of the magnet structure 2 can also be guided and constrained to further enhance the focusing effect of the magnetic field. The voice coil motor 100 can be fixedly connected to the lens barrel through the third magnetic yoke 3.

In this embodiment, the magnetic yoke is further provided with a fourth magnetic yoke 4 extending in the front-back direction. The fourth magnetic yoke 4 is provided in the installation groove and is located between the two magnetic circuit components 20. The magnet 21 is respectively installed on the two side portions of the fourth magnetic yoke 4 in the up-down direction. The two magnets 21 are in close contact with the driving coil 3. This can not only enhance the focusing effect of the magnetic field, but also transfer the magnetic field to the driving coil 3 to improve the utilization rate of the magnetic field.

Referring to FIGS. 3 to 4, the present application also provides a zoom lens. The zoom lens is provided in photography, videography and various intelligent terminals (such as mobile phones, cars, robots, etc.). The zoom lens includes a lens assembly and a voice coil motor 100, the lens assembly includes an adjustable lens group 40 that can be movable in the front-back direction, and the driving coil 3 of the voice coil motor 100 is fixedly connected to the adjustable lens group 40. Because the zoom lens includes the voice coil motor 100, and the specific structure of the voice coil motor 100 refers to the above-mentioned embodiments. Since the voice coil motor 100 of the zoom lens adopts all the technical solutions of the above-mentioned embodiments, it at least has all the beneficial effects brought by the technical solutions of the above-mentioned embodiments, which will not be repeated here.

In the technical solution provided by the present application, when the lens is a zoom lens, a lens group is required to achieve zooming or focusing. By fixedly connecting the adjustable lens group 40 to the voice coil motor 100, the driving coil 3 has a longer travel, so that the focusing and zooming operations of the lens can be performed more quickly. A larger lens movement range is provided to achieve a wider zoom range. This means that focusing and zooming can be performed within a wider focal length range to meet different shooting needs. Since the driving stroke of the voice coil motor 100 is long, the voice coil motor 100 can realize more precise lens focusing and zooming control of the adjustable lens group 40, and can realize fine adjustment, making the adjustment of focusing and zooming factor more accurate and finer. Due to the longer travel of the voice coil motor 100, it can also achieve quieter operation and reduce the noise generated during lens focusing and zooming.

Further, the focusing function is usually implemented by the movement of one or more lens components. Movement of these lens components can change the focus of the image, allowing the zoom lens to focus on subjects at different distances. The focusing function is usually achieved through a manual focus ring, an autofocus system or a hybrid focus system. In this embodiment, there are multiple driving coils 3 and multiple adjustable lens groups 40, and each adjustable lens group 40 is fixedly connected to a corresponding driving coil 3. In this way, the lens group that needs to be automatically adjusted can be connected to the corresponding driving coil 3 to achieve automatic focusing or zooming.

It can be understood that the zoom lens further includes a control device and a position measurement device, and the control device is electrically connected to the position measurement device and the voice coil motor 100, for controlling operation of the voice coil motor 100 according to the position measurement device, thereby adjusting the position of each adjustable lens group 40.

The above are only some embodiments of the present application, and are not therefore limiting the scope of the present application. Under the inventive concept of the present application, equivalent structural transformations made by using the contents of the description and drawings of the present application, or directly or indirectly applied in other related technical fields, are included in the scope of the present application.

What is claimed is:

1. A voice coil motor, comprising:

a mounting base;

a magnet structure provided on the mounting base, wherein the magnet structure comprises two magnetic circuit components provided at intervals in an up-down direction, and each of the magnetic circuit components comprises two magnets provided at intervals in the up-down direction; magnetic poles are provided in a different manner on a side of the two magnets that are close to each other, and the two magnets form a magnetic gap extending in a front-back direction; and a driving coil comprising two wire groups provided opposite to each other in the up-down direction, wherein one of the wire groups is located in the magnetic gap formed by the two magnets of the magnetic circuit component, and the other wire group is located in the magnetic gap formed by the two magnets of the other magnetic circuit component; in response to that the driving coil is energized, the two magnetic circuit components are configured to generate an electromagnetic force with the driving coil to drive the driving coil to move in the front-back direction.

2. The voice coil motor of claim 1, wherein each of the magnets comprises a plurality of loadstones provided at intervals in the front-back direction.

3. The voice coil motor of claim 1, wherein the mounting base is configured as a magnetic yoke, and the magnetic yoke is configured to form a mounting groove with an opening; the opening is provided on a side of the magnetic yoke in a left-right direction and extends in the front-back direction, and the magnet structure and the driving coil are both installed in an installation cavity.

4. The voice coil motor of claim 3, wherein the magnetic yoke comprises two first magnetic yokes extending in the front-back direction and provided at intervals in the up-down direction; and a side of one first magnetic yoke facing the other first magnetic yoke is fixed to the magnet.

5. The voice coil motor of claim 4, wherein the two first magnetic yokes are recessed on the side surfaces close to each other to form limit grooves, and the magnet is installed in a corresponding limit groove.

6. The voice coil motor of claim 4, wherein the magnetic yoke further comprises two second magnetic yokes provided at intervals in the front-back direction, and the two second magnetic yokes are respectively provided at two ends of the two first magnetic yokes in the front-back direction.

7. The voice coil motor of claim 6, wherein the magnetic yoke further comprises a third magnetic yoke provided at side ends of the two first magnetic yokes in the left-right direction, and the two first magnetic yokes, the two second magnetic yokes and the third magnetic yoke are enclosed to form the installation cavity.

8. The voice coil motor of claim 3, wherein the magnetic yoke is further provided with a fourth magnetic yoke extending in the front-back direction, and the fourth magnetic yoke is provided in the mounting groove and located between the two magnetic circuit components; and the magnet is respectively installed on two sides of the fourth magnetic yoke in the up-down direction.

9. A zoom lens, comprising:

a lens assembly, comprising an adjustable lens group movable in a front-back direction; and the voice coil motor of claim 1, wherein the voice coil motor is provided with a driving coil fixedly connected to the adjustable lens group.

10. The zoom lens of claim 9, wherein multiple driving coils and multiple adjustable lens groups are provided, and each of the adjustable lens groups is fixedly connected to a corresponding driving coil.

* * * * *